(12) United States Patent
Sung et al.

(10) Patent No.: US 10,791,487 B1
(45) Date of Patent: *Sep. 29, 2020

(54) CONTROLLING HANDOVER BETWEEN DUAL-CONNECTIVITY SERVICE AND STANDALONE SERVICE, WITH DYNAMIC HANDOVER THRESHOLD

(71) Applicant: Sprint Spectrum L.P., Overland Park, KS (US)

(72) Inventors: Sanghoon Sung, Ashburn, VA (US); Yun Sung Kim, Ashburn, VA (US); Hau Tran, Centerview, VA (US); Sandeep Mangrulkar, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,176

(22) Filed: Dec. 5, 2019

Related U.S. Application Data (63) Continuation of application No. 16/270,831, filed on Feb. 8, 2019, now Pat. No. 10,548,056.

(51) Int. Cl.
 *H04W 36/00* (2009.01)
(52) U.S. Cl.
 CPC ... *H04W 36/0069* (2018.08); *H04W 36/0066* (2013.01); *H04W 36/00837* (2018.08)
(58) Field of Classification Search
 CPC ......... H04W 36/0069; H04W 36/0066; H04W 36/00837

USPC ................. 455/437, 436, 442, 445
See application file for complete search history.

(56) References Cited

U.S. PATENT DOCUMENTS

| | | | |
|---|---|---|---|
| 9,426,642 B1* | 8/2016 | Sridhar | H04W 8/06 |
| 9,894,602 B1 | 2/2018 | Manchanda et al. | |
| 10,356,673 B2 | 7/2019 | Wong et al. | |
| 10,548,056 B1* | 1/2020 | Sung | H04W 36/0069 |
| 2014/0328318 A1* | 11/2014 | Sundararajan | H04W 36/0069 370/331 |
| 2014/0329526 A1 | 11/2014 | Sundararajan et al. | |
| 2014/0341109 A1* | 11/2014 | Cartmell | H04L 43/50 370/328 |
| 2014/0364123 A1 | 12/2014 | Shahidi et al. | |
| 2015/0289153 A1 | 10/2015 | Gopal et al. | |
| 2016/0174195 A1* | 6/2016 | Lee | H04L 65/4076 370/312 |

(Continued)

*Primary Examiner* — Marceau Milord (57) ABSTRACT

A method for controlling handover of a user equipment device (UE) between (i) a first cell site that provides dual-connectivity service on a first radio access technology (RAT) and a second RAT and (ii) a second cell site that provides standalone first-RAT service, wherein the handover includes transitioning the UE from source first-RAT service to target first-RAT service. The method includes setting a handover threshold to use as a basis to evaluate whether target first-RAT coverage detected by the UE is sufficiently stronger than source first-RAT coverage detected by the UE, where setting the handover threshold includes setting the handover threshold to a value selected based on whether the UE has detected that second-RAT coverage of the first cell site meets a defined threshold measurement threshold. Further, the method includes applying the set handover threshold as a basis to control whether to invoke the handover of the UE.

20 Claims, 5 Drawing Sheets

(56) References Cited

U.S. PATENT DOCUMENTS

| | | | |
|---|---|---|---|
| 2016/0330660 A1* | 11/2016 | Wong | H04B 17/318 |
| 2016/0360455 A1 | 12/2016 | Yang et al. | |
| 2016/0381615 A1* | 12/2016 | Nagaraja | H04W 36/0088 |
| | | | 455/436 |
| 2017/0019819 A1* | 1/2017 | Yang | H04W 36/0072 |
| 2018/0098258 A1* | 4/2018 | Annam | H04B 17/382 |
| 2019/0037417 A1 | 1/2019 | Lei et al. | |

\* cited by examiner

CONTROLLING HANDOVER BETWEEN DUAL-CONNECTIVITY SERVICE AND STANDALONE SERVICE, WITH DYNAMIC HANDOVER THRESHOLD

REFERENCE TO RELATED APPLICATION

This is a continuation of U.S. patent application Ser. No. 16/270,831, filed Feb. 8, 2019, the entirety of which is hereby incorporated by reference.

BACKGROUND

A cellular wireless network typically includes a number of cell sites having base stations that are configured to provide wireless coverage in which user equipment devices (UEs) such as cell phones, tablet computers, machine-type-communication devices, tracking devices, embedded wireless modules, and/or other wirelessly equipped communication devices (whether or not user operated) can operate. Further, each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the base station and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource request, the base station could responsively allocate particular uplink air-interface resources to carry the data, and the UE could then transmit the data to the base station on the allocated uplink resources.

Overview

When a UE enters into coverage of an example network, the UE could detect threshold strong coverage of a base station (e.g., a threshold strong reference signal broadcast by the base station) on a particular carrier and could then engage in random-access and Radio Resource Control (RRC) signaling to establish an RRC connection through which the base station will serve the UE on that carrier.

Further, if the UE is not already registered for service with the core network, the UE could transmit to the base station an attach request, which the base station could forward to a core-network controller for processing. And the core-network controller could then coordinate setup for the UE of one or more bearers extending between the UE and a core-network gateway that provides transport-network connectivity.

Once the UE is so connected and registered, the base station could then serve the UE in a connected mode on the carrier, managing downlink air-interface communication of packet data to the UE and uplink air-interface communication of packet data from the UE.

For example, when packet data for the UE arrives at the core network from a transport network, the data could flow to the UE's serving base station, and the base station could then schedule and provide transmission of that data to the UE on particular downlink air-interface resources of the carrier. Likewise, when the UE has data to transmit on the transport network, the UE could transmit a scheduling request to the base station, the base station could responsively schedule transmission of that data from the UE on particular uplink air-interface resources of the carrier, and the UE could accordingly transmit the data to the base station for forwarding through the core network to the transport network.

As the industry advances from one generation of wireless technology to the next, networks and UEs may also support simultaneous connectivity on connections according to multiple different RATs. With the transition from 4G to 5G, for instance, a wireless service provider that operates cell sites with 4G base stations could upgrade those cell sites to include 5G base stations as well and to support an arrangement referred to as EUTRA-NR Dual Connectivity (EN-DC). With EN-DC, a UE could initially discover threshold strong coverage of a cell site's 4G base station and establish a 4G connection with that base station, and the 4G base station could then coordinate establishment a co-existing 5G connection between the UE and the cell site's 5G base station. The 4G and 5G base stations could then serve the UE with packet-data communications concurrently on their respective connections with the UE, with a portion of data flowing over the UE's 4G connection with the 4G base station concurrently with another portion of the data flowing over the UE's 5G connection with the 5G base station.

More generally, dual-connectivity service of a UE involves the UE having co-existing connections according to multiple different RATs and being served with packet-data communication concurrently on those multiple different-RAT connections. This is to be distinguished from stand-alone (or single-connectivity) service of a UE, where the UE is served with packet-data communication according to just a single RAT, such as with just a 4G connection or just a 5G connection.

Advantageously, dual-connectivity can help to provide a UE with increased peak data rate by multiplexing packet-data onto multiple concurrent connections. Dual-connectivity could thus be desirable for UEs that are or will be engaged in high-throughput communication.

As a wireless service provider upgrades its network to add service according to a new RAT, the service provider may do so progressively from cell site to cell site. As a result, at least during that transition, while some of the cell sites in the provider's network may support providing dual-connectivity service on a first RAT and a second RAT, other cell sites in the network may support providing just standalone service on the first RAT. For instance, as a service provider adds 5G base stations to a network whose cell sites already include 4G base stations, some of the cell sites may include both 4G base stations and 5G base stations and support providing EN-DC service, while others of the cell sites may not yet include 5G base stations and may therefore support providing standalone 4G service but not EN-DC service.

In this situation, as a UE moves from cell site to cell site in the network, the UE may hand over between dual-connectivity service and standalone service. For instance, where a first cell site supports providing dual-connectivity service on a first RAT and second RAT and a neighboring second cell site supports providing standalone service on the first RAT but does not support providing the dual-connectivity service on the first RAT and second RAT, a UE moving between these cell sites may hand over from receiving dual-connectivity service in the first cell site to receiving just standalone service in the second cell site, or from receiving standalone service in the second cell site to receiving dual-connectivity service in the first cell site.

In a representative implementation, because the UE would be transitioning from a source cell site having a base station that provides first-RAT service (source first-RAT base station) to a target cell site also having a base station that provides first-RAT service (target first-RAT base station), the principle basis for triggering this handover could be a comparison of the first-RAT coverage strength detected by the UE in the source cell site (source first-RAT coverage strength) with the first-RAT coverage strength detected by the UE in the target cell site (target first-RAT coverage strength). Coverage strength respectively from each base station could be a measure of average total received power (e.g., received signal strength indicator (RSSI)) such as a reference-signal received power (RSRP) or could be a signal-to-interference ratio measure (e.g., reference-signal receive quality)), among other possibilities.

In particular, at issue could be whether the UE's detected target first-RAT coverage strength is threshold stronger than the UE's detected source first-RAT coverage strength. For this purpose, the UE could be provisioned with an "A3" measurement event or the like, which could define an offset (e.g., in decibels (dB)) between target coverage strength and source coverage strength (such as an RSRP threshold or 2 or 3 dB for instance). If and when the UE detects that particular target first-RAT coverage strength is greater by at least that offset than the UE's source first-RAT coverage strength, then the UE could responsively transmit a measurement report to the UE's serving first-RAT base station, and that base station could responsively engage in signaling to coordinate handover of the UE to the target first-RAT base station.

When this handover occurs, if the UE had dual-connectivity service in the source cell site but the target cell site supports just standalone first-RAT service, then the UE would transition from receiving dual-connectivity service in the source cell site to receiving standalone first-RAT service provided by the target first-RAT base station of the target cell site. In particular, the source first-RAT base station could coordinate teardown of the UE's second-RAT connection in the source cell site and could coordinate handover of the UE from receiving first-RAT service from the source first-RAT base station to receiving first-RAT service by the target first-RAT base station.

Whereas, if the UE had standalone first-RAT service in the source cell site but the target cell site supports dual-connectivity service, then the UE could transition from receiving standalone first-RAT service in the source cell site to receiving dual-connectivity service in the target cell site. In particular, the source first-RAT base station could coordinate handover of the UE from receiving first-RAT service from the source first-RAT base station in the source cell site to receiving first-RAT service from the target first-RAT base station in the target cell site, and the target first-RAT base station could further coordinate setup for the UE of a second-RAT connection in the target cell site.

Unfortunately, a problem with this handover process is that it is keyed to the UE's coverage strength on the first RAT and does not take into account the benefit of dual-connectivity service on the first RAT and second RAT. For standalone to dual-connectivity handover, for instance, this process does not account for the UE's target second-RAT coverage strength or for the extent to which target second-RAT service could be beneficial for the UE. And for dual-connectivity to standalone handover, the process does not account for the UE's source second-RAT coverage strength or for the extent to which the source second-RAT service could be beneficial for the UE.

The present disclosure provides an advance to help address this issue. In accordance with the disclosure, the handover threshold that is applied as a basis to determine whether a UE's target first-RAT coverage is sufficiently stronger than the UE's source first-RAT coverage will be dynamically set to a value that is selected based on whether the UE detects that the second-RAT coverage strength meets a defined measurement threshold. For instance, the handover threshold could be set to a first, default value if the UE does not detect that the second-RAT coverage strength meets the defined measurement threshold, whereas the handover threshold could be set to a second value different than the first value if the UE detects that the second-RAT coverage strength meets the defined measurement threshold. In either case, the set handover threshold could then be used as a basis to control whether (e.g., when) the UE will hand over between a source cell site and a target cell site.

This process could apply for handover of the UE in either direction between dual-connectivity service and standalone first-RAT service.

For examples, for handover from dual-connectivity service in a source cell site to standalone first-RAT service in a target cell site, the handover threshold for determining whether target first-RAT coverage is sufficiently stronger than source first-RAT coverage could be set based on whether the UE has detected that second-RAT coverage of the source sell cite is threshold weak (e.g., pursuant to an "A2" measurement event, such as the second-RAT coverage strength being on the order of −105 dBm or another designated low value). If the UE has not yet detected that the second-RAT coverage of the source cell site is threshold weak, then the handover threshold to be applied as a basis to determine whether the target first-RAT coverage is sufficiently stronger than the source first-RAT coverage could be set (e.g., maintained) at a first value such as a default value. Whereas, once the UE has detected that the second-RAT coverage of the source cell site is threshold weak, the handover threshold that to be applied as a basis to determine whether the target first-RAT coverage is sufficiently stronger than the source first-RAT coverage could be set to a lower value, so as to then help allow the handover to more readily occur.

And for handover from standalone first-RAT service in a source cell site to dual-connectivity service in a target cell site, the handover threshold for determining whether target first-RAT coverage is sufficiently stronger than source first-RAT coverage could be set based on whether the UE has detected that second-RAT coverage of the target sell cite is threshold strong (e.g., pursuant to a "B1" measurement event, such as the second-RAT coverage strength being on the order of at least −116 dBm to −95 dBm). If the UE has not yet detected that the second-RAT coverage of the target cell site is threshold strong, then the handover threshold to be applied as a basis to determine whether the target first-RAT coverage is sufficiently stronger than the source first-RAT coverage could be set (e.g., maintained) at a first value such as a default value. Whereas, once the UE has detected that the second-RAT coverage of the target cell site is threshold strong, the handover threshold that is to be applied as a basis to determine whether the target first-RAT coverage is sufficiently stronger than the source first-RAT coverage could be set to a lower value, so as to then help allow the handover to more readily occur.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE and 5G NR service and particularly in the context of a network that includes some cell sites that support 4G-only service and EN-DC service and other cell sites that support 4G-only service but do not support EN-DC service. It should be understood, however, that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including a first cell site 12 including a 4G base station 14 and a 5G base station 16, and a second cell site 18 including a 4G base station 20 but not including a 5G base station. (Note that these example cell sites might also support one or more other RATs aside from these, such as one or more legacy RATs for instance. But the focus of the example discussion here will be just 4G and 5G.)

Figure 1:
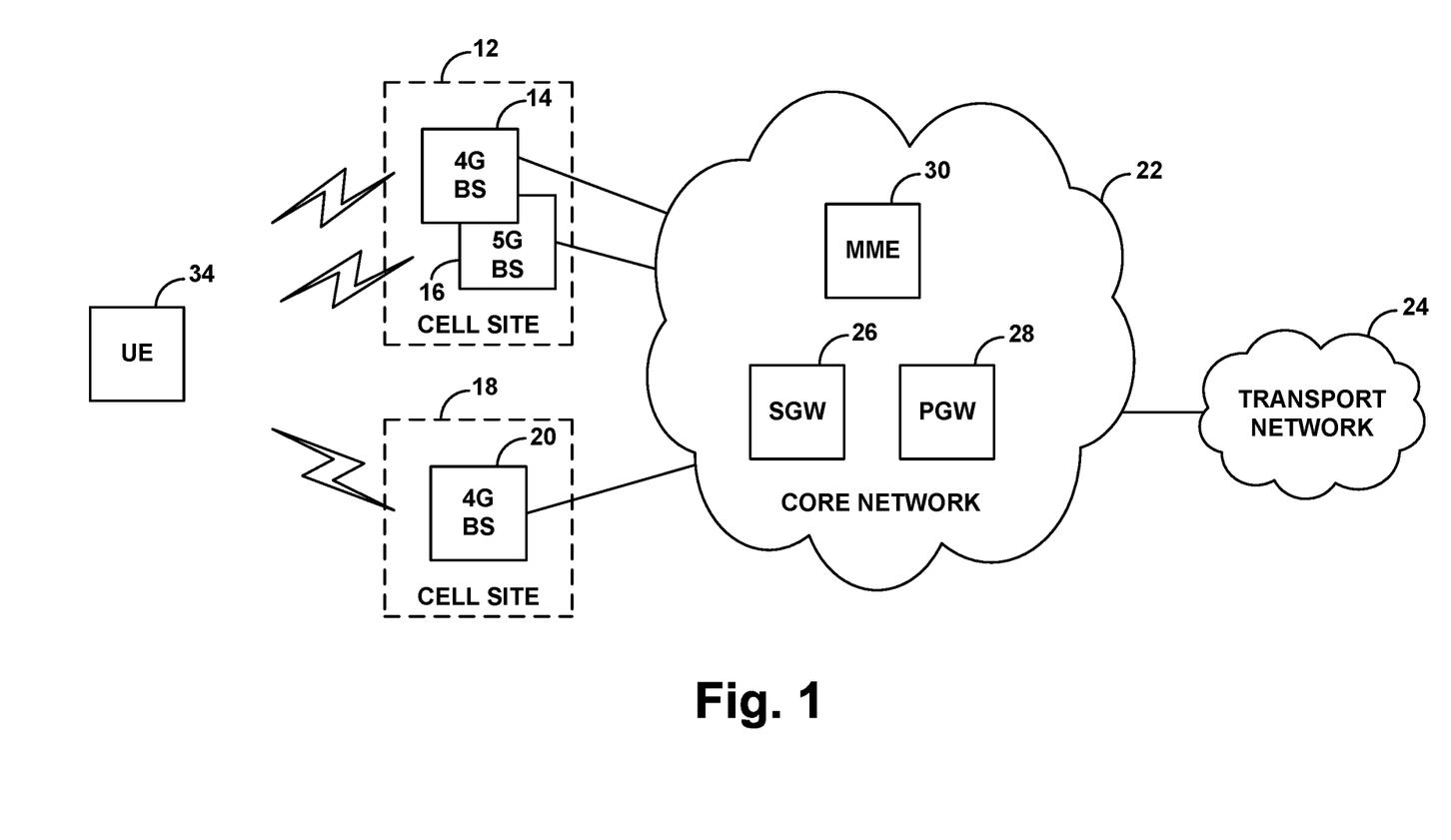
FIG. 1 is a simplified block diagram of an example wireless communication system in which various disclosed features can be implemented.

Each of these cell sites could be at a respective location within a region, and the two example cell sites could be adjacent to each other such that a UE served by a base station of one cell site might move from that cell site to another cell site and might then be served by a base station of the other cell site.

In addition, each base station could also take various forms. For instance, a base station could be a macro base station of the type that would typically include a tower mounted antenna structure for providing a broad range of coverage. Or a base station could be a small cell base station, femtocell base station, relay base station, or other type of base station that might have a smaller form factor with an antenna structure that provides a narrower range of coverage. Further, at cell site 12, the 4G and 5G base stations might share an antenna tower and/or other such structures. Other arrangements are possible as well.

Base stations 14, 16, and 20 are each shown coupled with an example core network 22. Core network 22 could be an enhanced packet core (EPC) network, a next generation core (NGC) network, or another network including components supporting an applicable radio access technology and providing connectivity with at least one transport network 24, such as the Internet.

In an example implementation as shown, the core network 22 includes a serving gateway (SGW) 26, a packet data network gateway (PGW) 28, and a mobility management entity (MME) 30. In practice, each base station could have an interface with the SGW and an interface with the MME, the MME could have an interface with the SGW, the SGW could have an interface with the PGW, and the PGW could provide connectivity with the transport network.

With this arrangement, the SGW and PGW cooperatively provide user-plane connectivity between each base station and the transport network, to enable a UE served by a base station to engage in communication on the transport network. And the MME operates as a controller to carry out operations such as coordinating UE attachment and setup of user-plane bearers.

As noted above, the air interface between each base station and UEs within its coverage could be structured to define various air-interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain.

Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

Note also that the 4G air interface and service provided respectively by 4G base stations 14 and 20 could differ from the 5G air interface and service provided by 5G base station 16 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In operation, when a UE enters into coverage of the base station on a carrier, the UE could detect the base station's synchronization signal and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request if appropriate, which the base station could forward to the MME for processing. And after authenticating the UE, the MME could coordinate setup for the UE of a user-plane bearer between the base station and the PGW, to enable the UE to engage in communication on the transport network. Further, the base station could coordinate establishment for the UE of a corresponding data radio bearer between the UE and the base station, and the base station could record the operational state of the UE.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

FIG. 1 depicts a representative UE 34 that is operating in an area of coverage overlap between cell site 12 and cell site 20. In a representative implementation, UE 34 is configured with a 4G radio and associated components to establish a 4G connection with a 4G base station and to be served according to 4G over that connection, and UE 34 also includes a 5G radio and associated components to establish a 5G connection with a 5G base station and to be served according to 5G over that connection. Further, UE 34 supports standalone 4G service, where the UE would have a 4G connection and no 5G connection as discussed above, and UE 34 further supports EN-DC, where the UE has co-existing 4G and 5G connections as discussed above.

In the representative implementation, if and when the UE connects with 4G base station 14 of cell site 12, 4G base station 14 could then coordinate setup of EN-DC service for the UE, possibly in response to determining that the UE is or will be engaged in a type of communication that could benefit from EN-DC service (e.g., high-throughput and/or low-latency data communication). For instance, 4G base station 14 could engage in signaling with 5G base station 16 and with the UE to arrange for setup of a 5G connection between 5G base station 16 and the UE, and 4G base station 14 could engage in signaling with the MME to arrange for splitting of the UE's user-plane bearer to facilitate data communication concurrently through the 4G base station 14 and the 5G base station 16.

While any such base station is serving the UE, the UE could also be provisioned to monitor for the occurrence of various measurement events and to report to the base station when the UE detects the occurrence of such events. Each measurement event could be defined in terms of threshold source and/or target coverage strength and/or threshold comparison between source and target coverage, among other possibilities.

For instance, one such measurement event is the "A3" event noted above—where UE's target coverage strength is greater than the UE's serving coverage strength by a specified threshold (e.g., in dB). Another measurement event is the "A2" event noted above—where the UE's serving coverage strength is lower than a specified threshold. And yet another measurement event is the "B1" event noted above—where the UE's target coverage strength on another RAT is higher than a specified threshold. Other examples could be possible as well.

The UE might be pre-provisioned with these or other such measurement events and/or associated logic indicating when to monitor for the occurrence of particular events. Alternatively or additionally, the base station might provision the UE with various such measurement events or associated logic, though RRC or other signaling to the UE.

In the context of FIG. 1, if the UE is currently being served by 4G base station 14 of cell site 12 and the UE is moving from cell site 12 to cell site 18, the UE could monitor to determine when the A3 measurement event occurs with respect to 4G coverage, by comparing target 4G coverage strength from 4G base station 18 to source 4G coverage strength from 4G base station 14. When the UE detects that the target 4G coverage strength from 4G base station 20 is greater by at least the A3 threshold value than the serving 4G coverage strength from 4G base station 14, the UE could responsively generate and transmit a measurement report to it serving 4G base station 14. And in response, 4G base station 14 could engage in inter-base-station signaling with 4G base station 20 to coordinate handover of the UE, so that the UE would transition from 4G service provided by 4G base station 14 of cell site 12 to 4G service provided by 4G base station 20 of cell site 18.

Likewise, if the UE is currently being served by 4G base station 20 of cell site 18 and the UE is moving from cell site 18 to cell site 12, the UE could monitor to determine when the A3 measurement event occurs with respect to 4G coverage by comparing target 4G coverage strength from 4G base station 14 to source 4G coverage strength from 4G base station 20. When the UE determines that the target 4G coverage strength from 4G base station 14 is greater by at least the A3 threshold value than the serving 4G coverage strength from 4G base station 20, the UE could responsively generate and transmit a measurement report to it serving 4G base station 20. And in response, 4G base station 20 could then engage in inter-base-station signaling with 4G base station 14 to coordinate handover of the UE, so that the UE would transition from 4G service provided by 4G base station 20 of cell site 18 to 4G service provided by 4G base station 14 of cell site 12.

In line with the discussion above, the present disclosure further provides that if the UE handover at issue would be between EN-DC service and standalone 4G service, this A3 threshold value (or the like) used as a basis to determine whether the UE's target 4G coverage is threshold stronger than the UE's serving 4G coverage could be dynamically set or varied based on whether the UE detects threshold strong 5G coverage.

By way of example, this process could apply where the UE is currently served with EN-DC by base stations 14 and 16 of cell site 12 and where the issue is whether and when the UE should hand over to instead by served with standalone 4G service by base station 20 of cell site 18.

In this situation, the UE could be configured to monitor for occurrence the A3 measurement event based on a comparison of target 4G coverage of 4G base station 20 with the UE's serving 4G coverage of 4G base station 14. But the UE could also be configured to monitor for occurrence of the A2 measurement event as to the UE's serving 5G coverage from 5G base station 16, and the A3 threshold that the UE applies in monitoring for occurrence of the A3 measurement event could be set to a value that is selected based on whether the UE has detected occurrence of the A2 measurement event—and perhaps based on whether the UE has reported occurrence of the A2 measurement event.

If the UE has not yet detected occurrence of the A2 measurement event as to the UE's serving 5G coverage, then the A3 threshold could be set to a first value. And if and when the UE detects the occurrence of the A2 measurement event as to the UE's serving 5G coverage, the A3 threshold could then be decreased to be a second value lower than the first value, so as to more readily allow handover of the UE from the UE's serving 4G base station 14 to target 4G base station 20.

For instance, when the UE detects the occurrence of the A2 event, the UE could respond by autonomously decreasing the A3 threshold that the UE will then apply for determining when the A3 measurement event occurs. Alternatively or additionally, when the UE reports to its serving 4G base station 14 the occurrence of the A2 measurement event, the base station could responsively provision the UE with a decreased A3 threshold for the UE to apply in determining when the A3 measurement event occurs.

Decreasing the A3 threshold in this manner could enable the UE to more readily hand over from the UE's serving 4G base station 14 to target 4G base station 20. In particular, the lower A3 threshold would define a smaller offset (e.g., in dB) between the target 4G coverage and the UE's serving 4G coverage, and so the UE may more readily detect and report the occurrence of the A3 event so as to trigger the handover. And fostering the UE's handover from 4G base station 14 to 4G base station 20 in this manner could be advantageous, as the 5G service of the UE's existing EN-DC service is currently threshold weak and so the UE may not be benefitting as much the EN-DC service that the UE has in cell site 12.

Variations on this process are possible as well. For instance, the UE could be initially provisioned to apply a first A3 threshold. And if and when the UE then detects occurrence of the A3 measurement event based on that first A3 threshold, at issue could be whether the UE has detected occurrence of the A2 measurement event as to the UE's serving 5G coverage. If the UE has not yet detected occurrence of the A2 measurement event as to the UE's serving 5G coverage, then the A3 threshold could be increased—so as to defer the UE's handover from the UE's serving 4G base station 14 to the target 4G base station 20. (For instance, the threshold might be increased from 2 or 3 dB to a higher value up to 15 dB or so.) The UE could then apply this increased A3 threshold until the UE detects the occurrence of the A2 measurement event. And if and when the UE detects the occurrence of the A2 measurement event, the UE could then be handed over from 4G base station 14 to 4G base station 20.

With these example implementations, handover of the UE from its serving 4G base station 14 of cell site 12 to target 4G base station 20 of cell site 18 could involve transitioning of the UE from EN-DC service in cell site 12 to standalone 4G service in cell site 18. In particular, the UE's serving 4G base station 14 could coordinate release of the UE's 5G connection with 5G base station 16 and could coordinate handover of the UE from being served by 4G base station 14 to being served instead by 4G base station 20 of cell site 18.

As another example, the disclosed process could apply where the UE is currently served with standalone 4G service by 4G base station 20 of cell site 18 and where the issue is whether and when the UE should hand over to 4G base station 14 of cell site 12—perhaps to then receive EN-DC service in cell site 12.

In this situation, the UE could be configured to monitor for occurrence the A3 measurement event based on a comparison of target 4G coverage of 4G base station 14 with the UE's serving 4G coverage of 4G base station 20. But the UE could also be configured to monitor for occurrence of the B1 measurement event as to 5G coverage of cell site 12, and the A3 threshold that the UE applies in monitoring for occurrence of the A3 measurement event could be set to a value that is selected based on whether the UE has detected occurrence of the B1 measurement event—and perhaps based on whether the UE has reported occurrence of the B1 measurement event.

If the UE has not yet detected occurrence of the B1 measurement event as to 5G coverage from 5G base station 16, then the A3 threshold could be set to a first value, such as a default value. And if and when the UE detects the occurrence of the B1 measurement event as to 5G coverage from 5G base station 16, the A3 threshold could then be decreased to be a second value lower than the first value, so as to more readily allow handover of the UE from the UE's serving 4G base station 20 to target 4G base station 14. (For example, the A3 threshold could be decreased from 1 or 2 dB to a lower value down to −15 dB or so.)

For instance, when the UE detects the occurrence of the B1 event, the UE could respond by autonomously decreasing the A3 threshold that the UE will then apply for determining when the A3 measurement event occurs. Alternatively or additionally, when the UE reports to its serving 4G base station 20 the occurrence of the B1 measurement event, the base station could responsively provision the UE with a decreased A3 threshold for the UE to apply in determining when the A3 measurement event occurs. (In the latter implementation, the UE's serving 4G base station 20 could determine from reference data that 4G base station 14 is collocated with the 5G base station 16 that is the subject of the UE's B1 measurement report, and the 4G base station 20 could therefore direct the UE to apply the decreased A3 threshold specifically with respect to detected 4G coverage of 4G base station 14.) Decreasing the A3 threshold in this manner could enable the UE to more readily hand over from the UE's serving 4G base station 20 to target 4G base station 14. In particular, as in the above example, the lower A3 threshold would define a smaller offset (e.g., in dB) between the target 4G coverage and the UE's serving 4G coverage, and so the UE may more readily detect and report the occurrence of the A3 event so as to trigger the handover. And here, fostering the UE's handover from 4G base station 20 to 4G base station 14 in this manner could be advantageous, as the 5G service in target cell site 12 is currently threshold strong and so the UE might especially benefit from the EN-DC service that the UE could receive in cell site 12.

In this example implementation, when handover of the UE is to occur, the UE's serving 4G base station 20 of cell site 18 could coordinate handover of the UE to be served instead by 4G base station 14 of cell site 12. And once the UE is connected with 4G base station 14 of cell site 12, 4G base station 14 could coordinate setup of EN-DC service for the UE, by coordinating setup of a 5G connection between the 5G base station 16 and the UE and perhaps working with the MME to coordinate a bearer split for the UE.

Note that in the various implementations discussed above, the amount of adjustment made to the A3 threshold could be based on an analysis of the extent to which 5G service matters for the UE. For instance, the amount of adjustment could be set based consideration of how the 5G carrier bandwidth compares with the 4G carrier bandwidth. (This analysis might assume that the 4G carrier bandwidth in cell site 12 is the same as the 4G carrier bandwidth in cell site 18. And at issue could be how that 4G carrier bandwidth compares with the 5G carrier bandwidth in cell site 12.)

If the 5G bandwidth is much greater than the 4G bandwidth, that could mean that gaining or losing 5G service (e.g., transitioning between EN-DC service and standalone service) is more significant. Whereas, if the 5G bandwidth is not so much greater than the 4G bandwidth (or is equal to or less than the 4G bandwidth), that could mean that gaining or losing 5G service is less significant.

Thus, in any example above where the A3 threshold is going to be decreased from one value to another based on consideration of whether the UE has detected (e.g., reported) occurrence of the A2 measurement event or the B1 measurement event, the amount of that decrease could be selected based on a ratio of the 4G carrier bandwidth to the 5G carrier bandwidth. And in any example above where the A3 threshold is going to be increased from one value to another based on consideration of whether the UE has detected (e.g., reported) occurrence of the A2 measurement event or the B1 measurement event, the amount of that increase could likewise be selected based on a ratio between the 4G carrier bandwidth and the 5G carrier bandwidth.

For instance, if the 4G bandwidth and 5G bandwidth are equal, then change in the A3 threshold value could set to 3 dB. Whereas, if the 4G bandwidth is half of the 5G bandwidth, then the change in the A3 threshold value could be set to 6 dB, and if the 4G bandwidth is one third of the 5G carrier bandwidth, then the change in the A3 threshold value could be set to 9 dB. Further, if the 4G bandwidth is twice the 5G bandwidth, then the change in the A3 threshold value could be set to 2 dB, and if the 4G bandwidth is three times the 5G carrier bandwidth, then the change in the A3 threshold value could be set to 1 dB. Other examples are possible as well.

Figure 2:
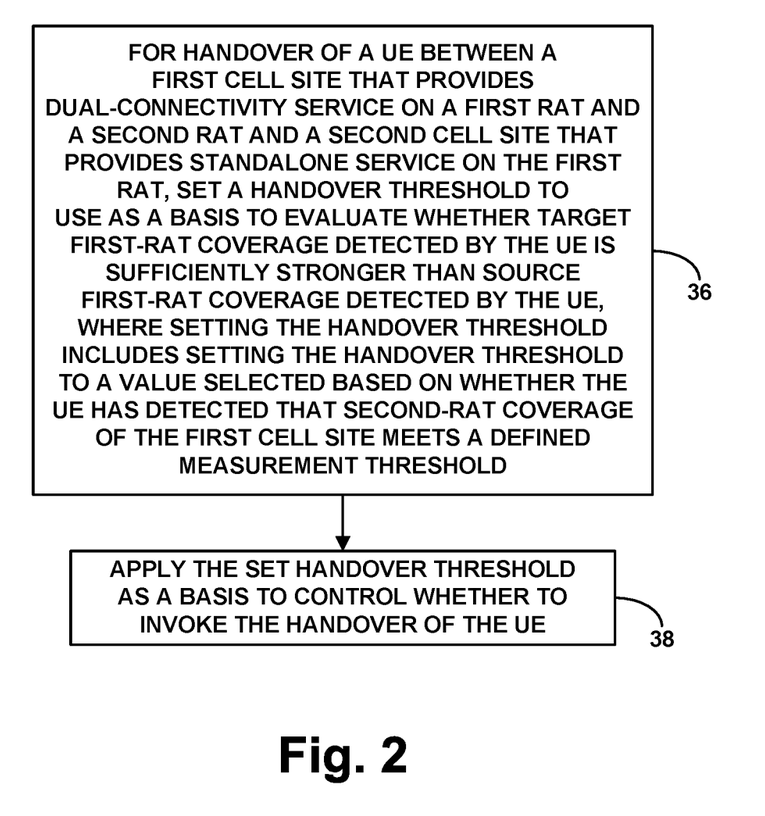
FIG. 2 is a flow chart depicting an example method in accordance with the present disclosure.

FIG. 2 is a flow chart depicting a method that can be carried out in accordance with the present disclosure, to control handover of a user equipment device (UE) between (i) a first cell site that provides dual-connectivity service on a first RAT and a second RAT and (ii) a second cell site that provides standalone first-RAT service, where the handover includes transitioning the UE from source first-RAT service to target first-RAT service, such as from being served by a first-RAT base station one of the cell sites to being served by a first-RAT base station in the other cell site.

As shown in FIG. 2, at block 36, the method includes setting a handover threshold to use as a basis to evaluate whether target first-RAT coverage detected by the UE is sufficiently stronger than source first-RAT coverage detected by the UE, where setting the handover threshold includes setting the handover threshold to a value selected based on whether the UE has detected that second-RAT coverage of the first cell site meets a defined measurement threshold. And at block 38, the method includes applying the set handover threshold as a basis to control whether to invoke the handover of the UE.

This method could be implemented by the UE, by a base station serving the UE, and/or by one or more other entities.

For example, the act of setting the handover threshold could involve the UE being set to apply a particular handover-threshold value (such as by maintaining a preset value and/or changing or newly setting the value) and/or could involve the UE's serving base station directing the UE to apply the particular handover-threshold value.

Further, the act of applying the set handover threshold could involve the UE using the handover threshold as a basis to determine whether the target first-RAT coverage detected by the UE is sufficiently stronger than the source first-RAT coverage detected by the UE, as a basis to determine whether to provide a measurement report that will trigger handover of the UE from one cell site to the other. Or the act of applying the set handover threshold could involve the UE's serving base station using the handover threshold as a basis to determine whether the target first-RAT coverage strength reported by the UE is sufficiently higher than the source first-RAT coverage strength reported by the UE, as a basis to determine whether to process a handover of the UE from one cell site to the other.

In a representative implementation as discussed above, the handover threshold at issue could be an A3 threshold, as an offset value, the question being whether the target first-RAT coverage is stronger than the source first-RAT coverage by at least that offset value. Variations are possible as well.

As discussed above, in this method, the handover could be from the first cell site to the second cell site. And in that case, the UE could be served with the dual-connectivity service in the first cell site, and the setting of the handover threshold to a value selected based on whether the UE has detected that second-RAT coverage of the first cell site meets the defined measurement threshold could involve setting the handover threshold to a value selected based on whether the UE has detected that the second-RAT coverage of the first cell site is threshold weak.

In a representative implementation, the defined measurement threshold could be an A2 threshold, as a coverage strength value, the question being whether the UE has detected that the second-RAT coverage strength is at least as low as that coverage strength value, perhaps whether the UE has reported having detected such low strength of the second-RAT coverage.

For instance, setting the handover threshold to a value selected based on whether the UE has detected that the second-RAT coverage of the first cell site is threshold weak could involve (i) setting the handover-threshold to a first handover-threshold value and (ii) increasing the handover-threshold from the first handover-threshold value to a second handover-threshold value in response to determining that the UE has not yet reported that the second-RAT coverage of the first cell site is threshold weak.

Further, the method could additionally include determining a ratio of first-RAT bandwidth to second-RAT bandwidth and configuring the second handover-threshold value to be higher than the first handover-threshold value by a delta that is based on the determined ratio, such as by a delta that is set proportionally to the determined ratio as discussed above.

Alternatively as discussed above, the handover could be from the second cell site to the first cell site. And in that case, the UE could be served with the standalone first-RAT service in the second cell site, and the act of setting the handover threshold to a value selected based on whether the UE has detected that the second-RAT coverage of the first cell site meets the defined measurement threshold could involve setting the handover threshold to a value selected based on whether the UE has detected that the second-RAT coverage of the first cell site is threshold strong.

In a representative implementation, the defined measurement threshold in this case could be a B1 threshold, as a coverage strength value, the question being whether the UE has detected that the second-RAT coverage strength is at least as high as that coverage strength value, perhaps whether the UE has reported having detected such high strength of the second-RAT coverage.

For instance, setting the handover threshold to a value selected based on whether the UE has detected that the second-RAT coverage of the first cell site is threshold strong could involve (i) selecting as the handover-threshold value a first handover-threshold value if the UE has not detected that the second-RAT coverage of the first cell site is threshold strong and (ii) selecting as the handover-threshold value a second handover-threshold value less than the first handover-threshold value if the UE has detected that the second-RAT coverage of the first cell site is threshold strong.

Further, the method in this case could additionally include determining a ratio of first-RAT bandwidth to second-RAT bandwidth and configuring the second handover-threshold value to be lower than the first handover-threshold value by a delta that is based on the determined ratio, such as by a delta that is set proportionally to the determined ratio as discussed above.

Figure 3:
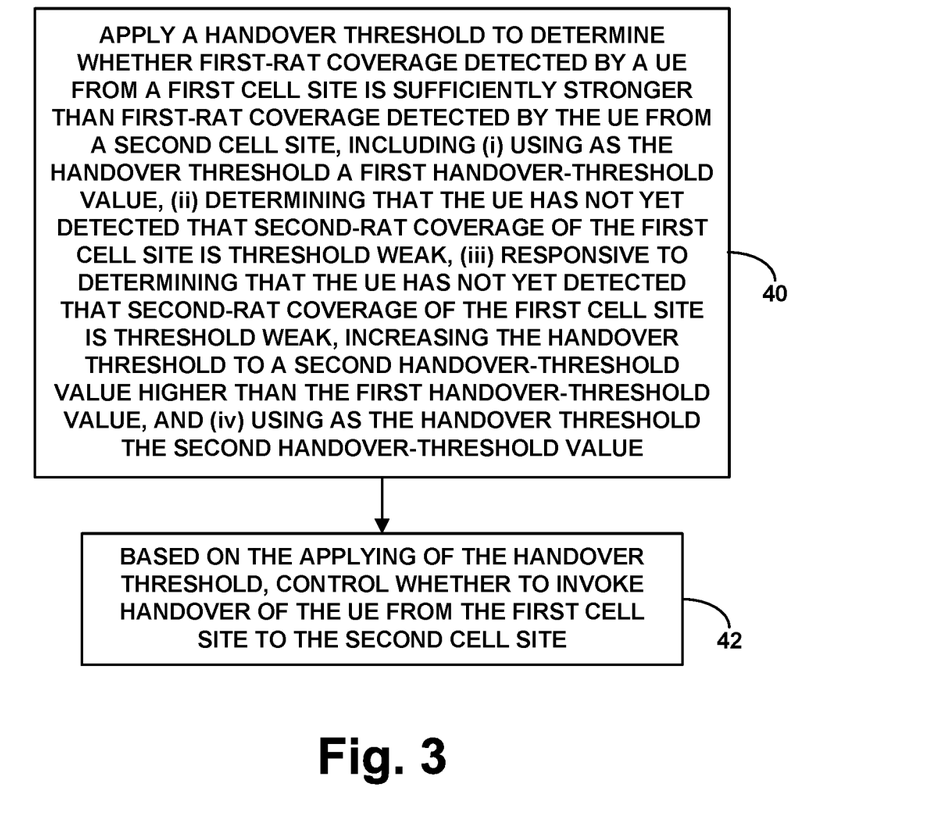
FIG. 3 is another flow chart depicting an example method in accordance with the present disclosure.

FIG. 3 is next a flow chart depicting a method for controlling handover of a UE from a first cell site in which the UE is served with dual-connectivity on a first RAT and a second RAT to a second cell site that provides standalone first-RAT service and does not provide service on the second RAT. Here too, the method could be implemented by the UE, by a base station serving the UE, and/or by one or more other entities.

As shown in FIG. 3, at block 40, the method involves applying a handover threshold to determine whether first-RAT coverage detected by the UE from the second cell site is sufficiently stronger than first-RAT coverage detected by the UE from the first cell site, including (i) using as the handover threshold a first handover-threshold value, (ii) determining that the UE has not yet detected that second-RAT coverage of the first cell site is threshold weak, (iii) responsive to determining that the UE has not yet detected that second-RAT coverage of the first cell site is threshold weak, increasing the handover threshold to a second handover-threshold value higher than the first handover-threshold value, and (iv) using as the handover threshold the second handover-threshold value. And at block 42, the method includes, based on the applying of the handover threshold, controlling whether to invoke the handover of the UE from the first cell site to the second cell site.

Various features described above can be applied in this context, and vice versa. For example, the method can additionally involve determining a ratio of first-RAT bandwidth to second-RAT bandwidth and configuring the second handover-threshold value to be higher than the first handover-threshold value by a delta that is based on the determined ratio.

Figure 4:
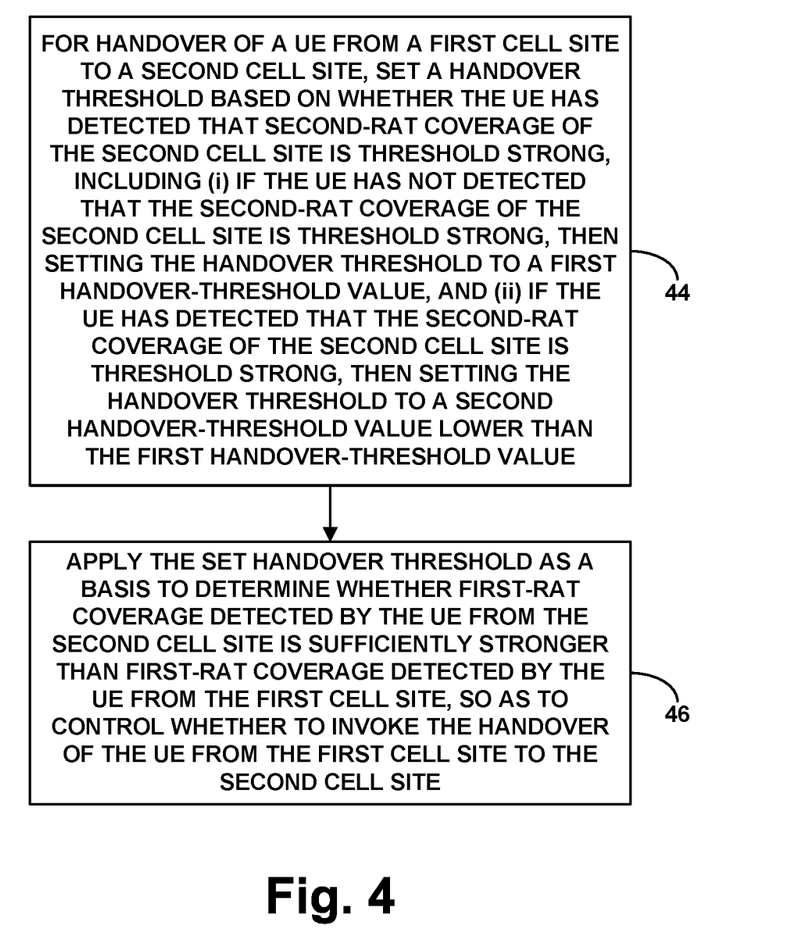
FIG. 4 is another flow chart depicting an example method in accordance with the present disclosure.

FIG. 4 is next a flow chart depicting a method for controlling handover of a UE from a first cell site in which the UE is served with standalone service on a RAT to a second cell site that provides dual-connectivity on the first RAT and a second RAT. Here too, the method could be implemented by the UE, by a base station serving the UE, and/or by one or more other entities.

As shown in FIG. 4, at block 44, the method involves setting a handover threshold based on whether the UE has detected that second-RAT coverage of the second cell site is threshold strong, including (i) if the UE has not detected that the second-RAT coverage of the second cell site is threshold strong, then setting the handover threshold to a first handover-threshold value, and (ii) if the UE has detected that the second-RAT coverage of the second cell site is threshold strong, then setting the handover threshold to a second handover-threshold value lower than the first handover-threshold value. And at block 46, the method includes applying the set handover threshold as a basis to determine whether first-RAT coverage detected by the UE from the second cell site is sufficiently stronger than first-RAT coverage detected by the UE from the first cell site, so as to control whether to invoke the handover of the UE from the first cell site to the second cell site.

Here as well, various features discussed above can be applied in this context, and vice versa. For example, the method can additionally involve determining a ratio of first-RAT bandwidth to second-RAT bandwidth and configuring the second handover-threshold value to be lower than the first handover-threshold value by a delta that is based on the determined ratio, such as by a delta that is determined proportionally to the ratio.

Figure 5:
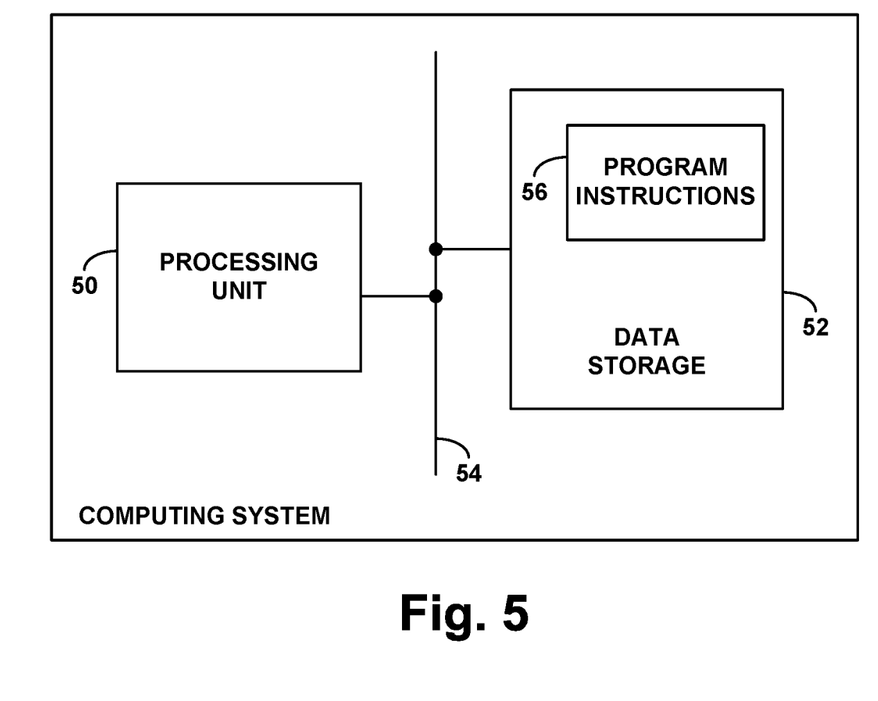
FIG. 5 is a simplified block diagram of an example computing system operable in accordance with the present disclosure.

Finally, FIG. 5 is a simplified block diagram of a computing system that could carry out various features as discussed above. This computing system could be incorporated in a UE, a serving base station, or one or more other entities for instance. As shown in FIG. 5, the computing system includes a processing unit 50 and non-transitory data storage 52, which could be integrated or communicatively linked together by a system bus, network, or other connection mechanism 54.

The processing unit 50 could comprise one or more processors, such as one or more microprocessors or specialized processors. And the data storage 52 could comprise on or more volatile and/or non-volatile storage components, such as magnetic, optical, or flash storage media. As further shown, the data storage could hold, store, encode, or otherwise embody program instructions 56. In a representative implementation, those program instructions 56 could be executable by the processing unit 50 to carry out various features described above. Various features described above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling handover of a user equipment device (UE) between (i) a first cell site that provides dual-connectivity service on a first radio access technology (RAT) and a second RAT and (ii) a second cell site that provides standalone first-RAT service, wherein the handover includes transitioning the UE from source first-RAT service to target first-RAT service, the method comprising:

setting a handover threshold to use as a basis to evaluate whether target first-RAT coverage detected by the UE is sufficiently stronger than source first-RAT coverage detected by the UE, wherein setting the handover threshold comprises setting the handover threshold to a value selected based on whether the UE has detected that second-RAT coverage of the first cell site meets a defined measurement threshold; and applying the set handover threshold as a basis to control whether to invoke the handover of the UE.

2. The method of claim 1, wherein the handover threshold is an A3 threshold.

3. The method of claim 1, wherein the handover is from the first cell site to the second cell site, wherein the UE is served with the dual-connectivity service in the first cell site, and wherein setting the handover threshold to a value selected based on whether the UE has detected that second-RAT coverage of the first cell site meets the defined measurement threshold comprises setting the handover threshold to a value selected based on whether the UE has detected that the second-RAT coverage of the first cell site is threshold weak.

4. The method of claim 3, wherein the defined measurement threshold is an A2 threshold.

5. The method of claim 3, wherein setting the handover threshold to a value selected based on whether the UE has detected that the second-RAT coverage of the first cell site is threshold weak comprises:

setting the handover-threshold to a first handover-threshold value; and increasing the handover-threshold from the first handover-threshold value to a second handover-threshold value in response to determining that the UE has not yet reported that the second-RAT coverage of the first cell site is threshold weak.

6. The method of claim 5, further comprising:

determining a ratio of first-RAT bandwidth to second-RAT bandwidth; and configuring the second handover-threshold value to be higher than the first handover-threshold value by a delta that is based on the determined ratio.

7. The method of claim 6, wherein delta is set proportionally to the determined ratio.

8. The method of claim 1, wherein the handover is from the second cell site to the first cell site, wherein the UE is served with the standalone first-RAT service in the second cell site, and wherein setting the handover threshold to a value selected based on whether the UE has detected that the second-RAT coverage of the first cell site meets the defined measurement threshold comprises setting the handover threshold to a value selected based on whether the UE has detected that the second-RAT coverage of the first cell site is threshold strong.

9. The method of claim 8, wherein the defined threshold is a B1 threshold.

10. The method of claim 8, wherein setting the handover threshold to a value selected based on whether the UE has detected that the second-RAT coverage of the first cell site is threshold strong comprises:

selecting as the handover-threshold value a first handover-threshold value if the UE has not detected that the second-RAT coverage of the first cell site is threshold strong; and selecting as the handover-threshold value a second handover-threshold value less than the first handover-threshold value if the UE has detected that the second-RAT coverage of the first cell site is threshold strong.

11. The method of claim 8, further comprising:
  determining a ratio of first-RAT bandwidth to second-RAT bandwidth; and
  configuring the second handover-threshold value to be lower than the first handover-threshold value by a delta that is based on the determined ratio.

12. The method of claim 11, wherein delta is set proportionally to the determined ratio.

13. The method of claim 1, wherein the first RAT is 4G LTE, wherein the second RAT is 5G NR, and wherein the dual-connectivity service is EN-DC service.

14. A computing system for controlling handover of a user equipment device (UE) between (i) a first cell site that provides dual-connectivity service on a first radio access technology (RAT) and a second RAT and (ii) a second cell site that provides standalone first-RAT service, wherein the handover includes transitioning the UE from source first-RAT service to target first-RAT service, the computing system comprising:
  a processing unit;
  non-transitory data storage; and
  program instructions in the non-transitory data storage, wherein the program instructions are executable by the processing unit to set a handover threshold to use as a basis to evaluate whether target first-RAT coverage detected by the UE is sufficiently stronger than source first-RAT coverage detected by the UE, wherein setting the handover threshold comprises setting the handover threshold to a value selected based on whether the UE has detected that second-RAT coverage of the first cell site meets a defined measurement threshold.

15. The computing system of claim 14, wherein the program instructions are further executable to apply the set handover threshold as a basis to control whether to invoke the handover of the UE.

16. The computing system claim 14, wherein the handover is from the first cell site to the second cell site when the UE is served with the dual-connectivity service in the first cell site, and wherein setting the handover threshold to a value selected based on whether the UE has detected that second-RAT coverage of the first cell site meets the defined measurement threshold comprises setting the handover threshold to a value selected based on whether the UE has detected that the second-RAT coverage of the first cell site is threshold weak.

17. The computing system of claim 14, wherein the handover is from the second cell site to the first cell site when the UE is served with the standalone first-RAT service in the second cell site, and wherein setting the handover threshold to a value selected based on whether the UE has detected that the second-RAT coverage of the first cell site meets the defined measurement threshold comprises setting the handover threshold to a value selected based on whether the UE has detected that the second-RAT coverage of the first cell site is threshold strong.

18. Non-transitory data storage embodying program instructions executable to cause a processing unit to carry out operations for controlling handover of a user equipment device (UE) between (i) a first cell site that provides dual-connectivity service on a first radio access technology (RAT) and a second RAT and (ii) a second cell site that provides standalone first-RAT service, wherein the handover includes transitioning the UE from source first-RAT service to target first-RAT service, the operations comprising:
  setting a handover threshold to use as a basis to evaluate whether target first-RAT coverage detected by the UE is sufficiently stronger than source first-RAT coverage detected by the UE, wherein setting the handover threshold comprises setting the handover threshold to a value selected based on whether the UE has detected that second-RAT coverage of the first cell site meets a defined measurement threshold.

19. The non-transitory data storage of claim 18, wherein the handover is from the first cell site to the second cell site when the UE is served with the dual-connectivity service in the first cell site, and wherein setting the handover threshold to a value selected based on whether the UE has detected that second-RAT coverage of the first cell site meets the defined measurement threshold comprises setting the handover threshold to a value selected based on whether the UE has detected that the second-RAT coverage of the first cell site is threshold weak.

20. The non-transitory data storage of claim 18, wherein the handover is from the second cell site to the first cell site when the UE is served with the standalone first-RAT service in the second cell site, and wherein setting the handover threshold to a value selected based on whether the UE has detected that the second-RAT coverage of the first cell site meets the defined measurement threshold comprises setting the handover threshold to a value selected based on whether the UE has detected that the second-RAT coverage of the first cell site is threshold strong.

\* \* \* \* \*